United States Patent
Bandyopadhyay et al.

(10) Patent No.: US 9,297,658 B2
(45) Date of Patent: Mar. 29, 2016

(54) WI-FI ENHANCED TRACKING ALGORITHMS

(71) Applicant: TRX Systems, Inc., Greenbelt, MD (US)

(72) Inventors: Amrit Bandyopadhyay, College Park, MD (US); Daniel Hakim, Silver Spring, MD (US); Carole Teolis, Glenn Dale, MD (US)

(73) Assignee: TRX Systems, Inc., Greenbelt, MD (US)

( * ) Notice: Subject to any disclaimer, the term of this patent is extended or adjusted under 35 U.S.C. 154(b) by 0 days.

(21) Appl. No.: 13/916,390

(22) Filed: Jun. 12, 2013

(65) Prior Publication Data

US 2013/0331121 A1    Dec. 12, 2013

Related U.S. Application Data

(60) Provisional application No. 61/658,883, filed on Jun. 12, 2012.

(51) Int. Cl.
*H04W 24/00* (2009.01)
*G01C 21/12* (2006.01)
(Continued)

(52) U.S. Cl.
CPC .............. *G01C 21/12* (2013.01); *G01C 21/165* (2013.01); *G01C 21/206* (2013.01); *G01S 5/0205* (2013.01); *G01S 5/0263* (2013.01); *H04W 64/00* (2013.01); *G01S 5/0268* (2013.01)

(58) Field of Classification Search
CPC ..... H04W 64/00; G01C 21/165; G01C 21/00; G01C 21/12; G01C 21/206; G01S 19/39; G01S 5/0263; G01S 5/0205; G01S 5/0268
USPC ................ 455/427, 456.1, 422.1, 456.3, 403, 455/456.6, 404.2; 701/412, 469, 434, 446, 701/445, 400, 408, 409, 213; 342/350, 450, 342/357, 357.12, 357.22, 357.25, 357.31; 340/500, 539.1, 539.13; 702/150
See application file for complete search history.

(56) References Cited

U.S. PATENT DOCUMENTS 6,024,655 A    2/2000    Coffee
6,560,531 B1   5/2003    Joshi
(Continued)

FOREIGN PATENT DOCUMENTS

WO    WO 2012/050932 A1    4/2012
WO    WO 2012/072957 A1    6/2012

OTHER PUBLICATIONS

U.S. Appl. No. 13/566,956, filed Aug. 3, 2012, Karvounis.
(Continued)

*Primary Examiner* — Mahendra Patel
(74) *Attorney, Agent, or Firm* — Baker & Hostetler LLP

(57) ABSTRACT

Disclosed herein is the use of Wi-Fi based location estimates of a mobile device to provide global offset corrections (including automated initialization) and enhanced navigation accuracy through delivery of heading corrections. In an embodiment, dead reckoning tracking data may be received for a tracked subject. The tracking data includes a plurality of tracking points forming a tracking path of the tracked subject. A Wi-Fi position system location estimate is also obtained. The Wi-Fi position system location estimate is one of a plurality of Wi-Fi position system location estimates correlated to the dead reckoning tracking data. And a tracking related parameter is determined based on the correlation of the dead reckoning tracking data to the Wi-Fi position system location estimate.

20 Claims, 9 Drawing Sheets

(51) Int. Cl.
*H04W 64/00* (2009.01)
*G01C 21/16* (2006.01)
*G01C 21/20* (2006.01)
*G01S 5/02* (2010.01)

(56) References Cited

U.S. PATENT DOCUMENTS

| | | | |
|---|---|---|---|
| 7,299,056 B2 | 11/2007 | Anderson | |
| 7,890,262 B2 | 2/2011 | Judd et al. | |
| 8,032,153 B2* | 10/2011 | Dupray et al. | 455/456.1 |
| 8,145,419 B2 | 3/2012 | Onome et al. | |
| 8,150,650 B2 | 4/2012 | Goncalves et al. | |
| 8,473,241 B2 | 6/2013 | Foxlin | |
| 8,538,687 B2 | 9/2013 | Plocher et al. | |
| 8,712,686 B2 | 4/2014 | Bandyopadhyay et al. | |
| 2002/0044081 A1 | 4/2002 | Cong | |
| 2007/0121560 A1* | 5/2007 | Edge | 370/338 |
| 2008/0077326 A1 | 3/2008 | Funk et al. | |
| 2008/0186234 A1* | 8/2008 | Alles | G01S 5/021 342/451 |
| 2009/0043504 A1* | 2/2009 | Bandyopadhyay et al. | 701/213 |
| 2009/0103503 A1* | 4/2009 | Chhabra | 370/338 |
| 2009/0303120 A1* | 12/2009 | Alizadeh-Shabdiz | G01S 5/0257 342/357.48 |
| 2009/0310585 A1* | 12/2009 | Alizadeh-Shabdiz | 370/338 |
| 2009/0322603 A1* | 12/2009 | Liao | G01S 5/10 342/357.29 |
| 2010/0305845 A1 | 12/2010 | Alexandre et al. | |
| 2011/0117924 A1* | 5/2011 | Brunner | G01S 5/0252 455/456.1 |
| 2011/0172906 A1 | 7/2011 | Das et al. | |
| 2011/0182238 A1 | 7/2011 | Marshall et al. | |
| 2011/0238308 A1 | 9/2011 | Miller et al. | |
| 2012/0021764 A1 | 1/2012 | Enright | |
| 2012/0143495 A1 | 6/2012 | Dantu | |
| 2013/0179067 A1 | 7/2013 | Trowbridge et al. | |
| 2013/0278594 A1 | 10/2013 | Kaatz et al. | |
| 2013/0293416 A1* | 11/2013 | Waters et al. | 342/357.31 |
| 2013/0311134 A1 | 11/2013 | Kordari et al. | |
| 2013/0332064 A1 | 12/2013 | Funk et al. | |
| 2013/0332065 A1 | 12/2013 | Hakim et al. | |

OTHER PUBLICATIONS

U.S. Appl. No. 13/616,350, filed Sep. 14, 2012, Bandyopadhyay et al.
U.S. Appl. No. 13/916,487, filed Jun. 12, 2013, Funk et al.
U.S. Appl. No. 61/658,883, filed Jun. 12, 2012, Bandyopadhyay et al.
U.S. Appl. No. 61/783,799, filed Mar. 14, 2013, Karvounis et al.
U.S. Appl. No. 61/783,908, filed Mar. 14, 2013, Funk et al.
U.S. Appl. No. 61/792,856, filed Mar. 15, 2013, Funk et al.

* cited by examiner

WI-FI ENHANCED TRACKING ALGORITHMS

CROSS REFERENCE TO RELATED APPLICATIONS

This application claims the benefit of U.S. Provisional Application No. 61/658,883, filed Jun. 12, 2012, titled "Advanced Navigation Engine." The contents are hereby incorporated by reference in its entirety.

GOVERNMENT RIGHTS

The subject matter disclosed herein was made with government support under award/contract/grant number DARPA W31P4Q-10-C-0380 awarded by the Defense Advanced Research Projects Agency. The Government may have certain rights in the herein disclosed subject matter.

INCORPORATION BY REFERENCE

This application addresses concepts discussed in the following previously-filed applications: "Method and System for Locating and Monitoring First Responders," U.S. Patent Publication Number 2008/0077326, filed May 31, 2007 and "System and method for locating, tracking, and/or monitoring the status of personnel and/or assets both indoors and outdoors," U.S. Patent Publication Number 2009/0043504, filed Aug. 6, 2008, the contents of each is hereby incorporated by reference in its entirety.

TECHNICAL FIELD

The technical field generally relates to a system and method for locating, tracking, and/or monitoring the status of personnel or assets, both indoors and outdoors.

BACKGROUND

Global Positioning Systems (GPS) are well known systems for locating and monitoring people and assets. However, public GPS operation is limited in its accuracy by design for various reasons. The operation and accuracy of a GPS can be further limited by environmental conditions, for example, urban environments can block or limit GPS satellite signals. At times, GPS receivers may have difficulty receiving GPS signals and calculating accurate position information.

SUMMARY

Disclosed herein are methods and systems for Wi-Fi enhanced tracking. In an embodiment, a method includes obtaining dead reckoning tracking data for a tracked subject obtained from a dead reckoning sensor, wherein the tracking data includes a plurality of tracking points forming a tracking path of the tracked subject; obtaining a Wi-Fi position system location estimate that is one of a plurality of Wi-Fi position system location estimates that are correlated to the dead reckoning tracking data; determining a tracking related parameter based on the correlation of the dead reckoning tracking data to the Wi-Fi position system location estimate.

In an embodiment, a system includes a dead reckoning sensor, a processor communicatively connected with the dead reckoning sensor, the processor adapted to execute computer-readable instructions; and a memory communicatively coupled to the processor. The memory has stored computer-readable instructions that, if executed by the processor, cause the processor to perform operations that include obtaining dead reckoning tracking data for a tracked subject obtained from a dead reckoning sensor, wherein the tracking data includes a plurality of tracking points forming a tracking path of the tracked subject; obtaining a Wi-Fi position system location estimate that is one of a plurality of Wi-Fi position system location estimates that are correlated to the dead reckoning tracking data; and determining a tracking related parameter based on the correlation of the dead reckoning tracking data to the Wi-Fi position system location estimate.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

BRIEF DESCRIPTION OF THE DRAWINGS

A more detailed understanding may be had from the following description, given by way of example in conjunction with the accompanying drawings wherein.

DETAILED DESCRIPTION OF ILLUSTRATIVE EMBODIMENTS

Figure 1:
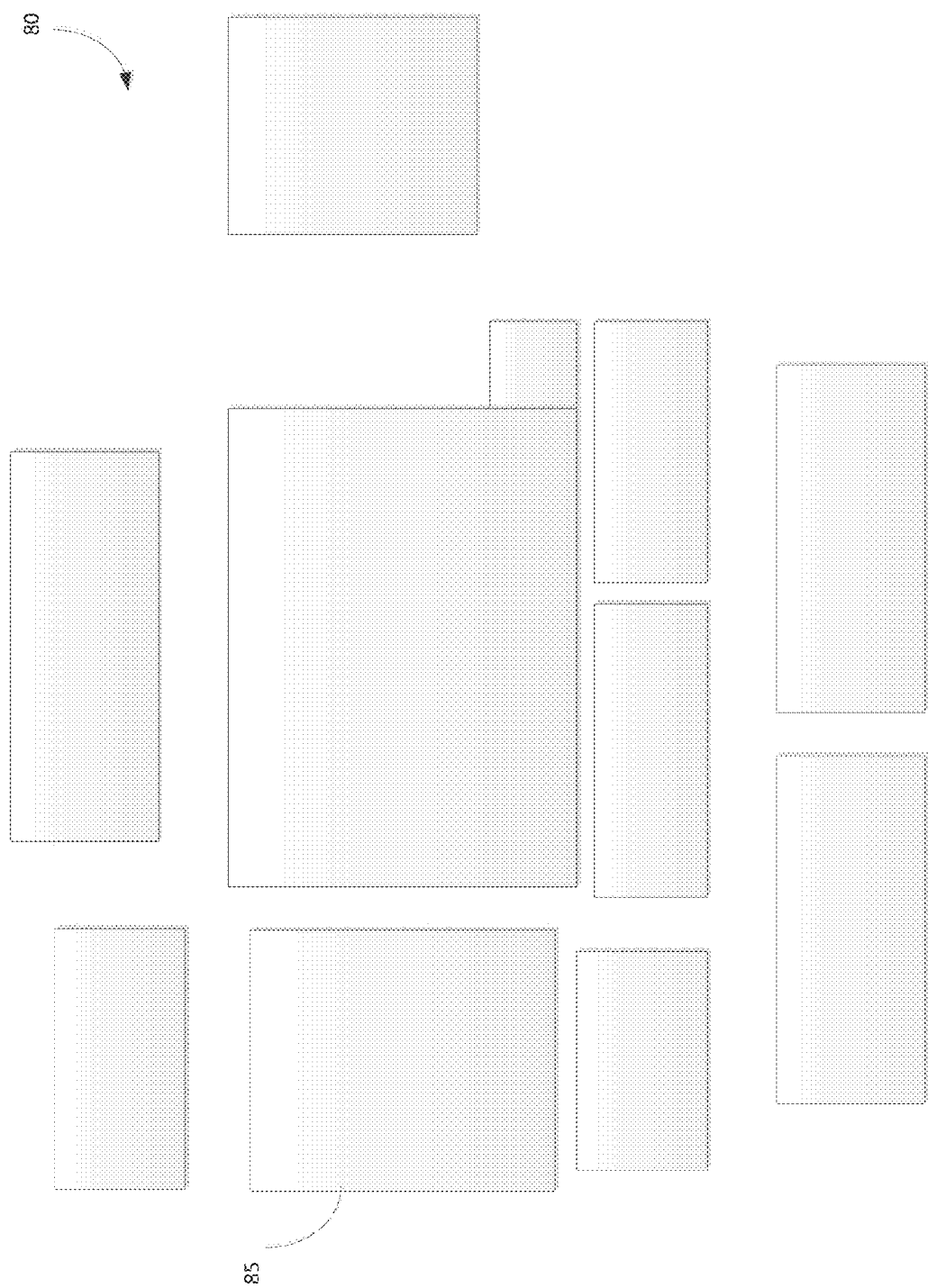
FIG. 1 is an exemplary illustration of an aerial view of an area that may be used in Wi-Fi enhanced tracking.

A navigation engine may fuse information from dead reckoning sensors (such as inertial, optic flow, Doppler velocimeter, or wheel encoder), pressure, magnetometer, GPS, ranging sensors, and existing and inferred maps to provide accurate position estimates. The navigation engine may use GPS to provide an automatic start location and periodic global corrections. However, GPS coverage may be unreliable or unavailable altogether in some areas, such as urban canyons and buildings. In such cases, Wi-Fi information is additional information that may be used to provide initialization and global corrections.

Disclosed herein is the use of Wi-Fi based location estimates of a mobile device to provide global offset corrections (including automated initialization) and enhanced navigation accuracy through delivery of heading corrections. A navigation engine may add custom functionality based on the tracked subject's terrain (e.g., indoors or outdoors), such as correcting the path based on given or inferred structure of an indoor environment. Wi-Fi may enhance the tracking accuracy to the point where it can be used to enhance location estimation decisions such as deciding between locations in one of two parallel hallways.

Using Wi-Fi to verify the GPS location of a mobile device enables the navigation engine to determine the accuracy and inaccuracy of GPS with greater speed and reliability, improving the quality and robustness of the overall tracking solution. Also, the Wi-Fi positioning system (WPS) location may be incorporated into the unique location signature saved for 3D locations for comparison and matching with future traversals. This is useful even when the WPS location estimates are inaccurate and degraded as they are indicative of the signal strengths from access points which are usually repeatable at a given location. In situations, where the WPS location estimate is consistent, even though inaccurate, the location estimate can be used to correct for dead reckoning error accumulation, e.g. inertial drift. In other words, WPS location info may be used as a location signature rather than for the location information itself.

Wi-Fi based location, often referred to as WPS, is a location technology that is a mechanism to track mobile devices. In WPS, signal strength from one or more in range wireless access points may be used by a Wi-Fi enabled mobile device to determine the location of the mobile device. For example, Wi-Fi access points may be mapped through a variety of means by "wardriving" (e.g. collecting mapping signal strength data for an area by driving around using GPS or other method for ground truth location), using the billing address for access point, and/or using data recovered by providers of GPS/Wi-Fi enabled devices. A Wi-Fi access point location provider may enter information about the wireless access points into a database, and use the surveyed signatures, signature matching, and other algorithms to determine an approximation of the mobile device's location using real-time Wi-Fi signal strengths. An extension of this mechanism is called a hybrid positioning system, which may combine WPS, GPS, and cell tower triangulation to provide a fused approximation of location.

Wi-Fi based location is typically claimed to be in the 10 to 20 meter accuracy range. However, the accuracy of the location is dependent on the number of wireless access points in the target location and how well the location was surveyed by the Wi-Fi access point location provider (e.g., Skyhook™ or Google™). In areas less dense with access points or areas that are poorly surveyed the accuracy varies from approximately 10 meters to a couple of hundreds of meters. WPS technology may satisfy the requirements of location based services (LBS), such as locating the closest gas station or coffee shop, but falls short for services that require more accuracy (e.g., accounting for personnel such as soldiers and firefighters).

A standalone WPS may enhance GPS intermittent or denied tracking. Some significant features of Wi-Fi include the ability to use Wi-Fi in urban areas where GPS reception is poor and the relatively short time need to establish a fix to Wi-Fi node, which is approximately one second, while GPS may take minutes. In addition, as Wi-Fi surveying quality improves, it allows for more advanced correction mechanisms that may be used by navigation engines.

The following example is a simplification of an actual test of Wi-Fi enhanced tracking. FIG. 1 is an exemplary illustration of a top view an area 80 where methods and systems for Wi-Fi enhanced tracking were tested, which did not result in the public use or public disclosure of the subject matter claimed herein. For the examples herein, area 80 serves as the base building configuration and WPS location configuration used to describe Wi-Fi enhanced tracking. Area 80 has intermittent GPS due to the urban canyon effects. There are moderately well surveyed WPS locations in area 80 because of the presence of a number of businesses with Wi-Fi. The rectangular shapes in area 80 represent buildings (e.g., building 85). In this test, an inertial sensor was used for dead reckoning.

Figure 2:
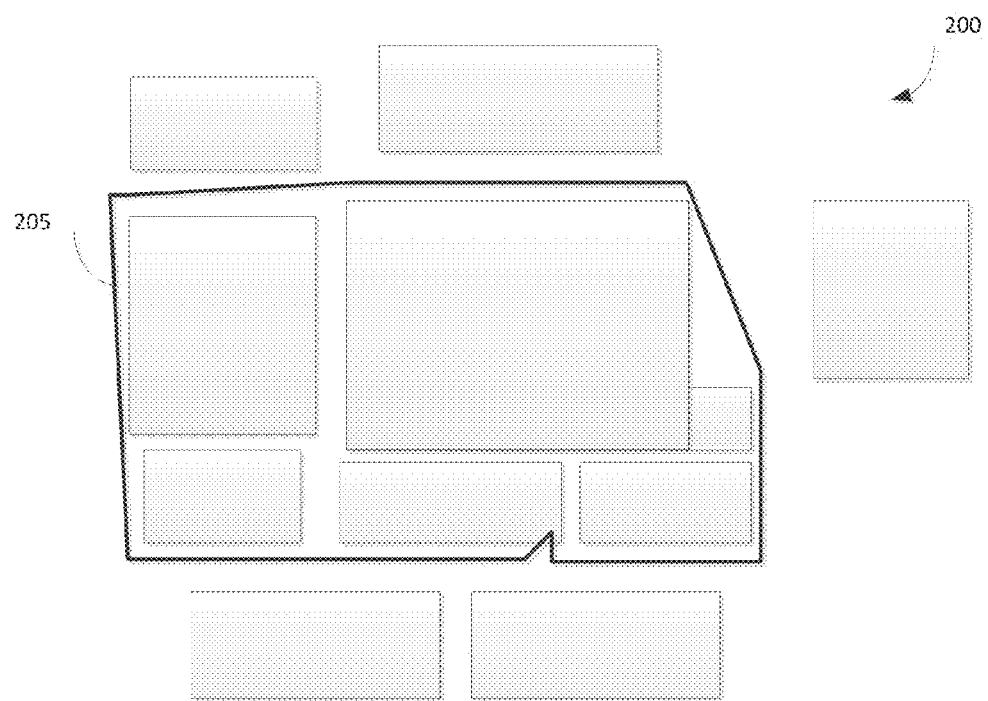
FIG. 2 illustrates an approximate actual path traversed with a mobile device.

The approximate actual path 205 traversed by a person walking with a mobile device through area 200 (the same configuration as 80) is shown in FIG. 2. The characteristics of the test path 205 traversed in area 200 included high magnetic interference in several sections when walking along the edge of the buildings, which is due to steel beam structures. Also, because there is no clear satellite view in the urban canyon of area 200 for a first fix, there is intermittent availability of GPS throughout the test path 205. In addition, the recorded inertial path displayed significant heading error due to gyroscopic drift. Lastly, the path 205 had a total distance of approximately 600 meters.

WPS location estimates at several known locations were analyzed to determine the accuracy trends of the Wi-Fi sensor in a practical environment. In other words, the actual location of the mobile device was compared to the WPS determined location of the mobile device in order to get a sense of the possible error that may be encountered. The reference locations where the WPS data were collected were surveyed using an earth mapping application which provides measurement accuracy within approximately 3 meters for ground truth. Since the predicted accuracy of the WPS location estimates is in the 20-100 meter range, this potential ground truth error is acceptable for characterization of Wi-Fi performance. Table 1 shows the measured WPS location accuracy at the reference points. The error circles are given to describe the spread of the errors seen. For example, 67% Error Circle is the radius of the circle that bounds 67% (which would be 1 standard deviation if the error distribution were Gaussian) of the readings.

TABLE 1

| Wi-Fi Accuracy in meters for the Test Path | | | | | |
|---|---|---|---|---|---|
| Avg Error | 5% Error Circle | 50% Error Circle | 67% Error Circle | 95% Error Circle | Max Error |
| 60.7 m | 12.7 m | 60.8 m | 79.3 m | 126.7 m | 174.5 m |

The following observations of Wi-Fi based location of a mobile device were considered in the Wi-Fi enhanced tracking approach discussed herein. Generally, the accuracy of WPS locations of a mobile device was in the 10 m range for around 5% of inlier points. The general accuracy of the reference location point was in 10 to 175 meter range, averaging at around 61 meters. The short term accuracy was shown to fluctuate. With regard to short-term accuracy, headings from one point to another were not a good indicator of a tracked subject's (e.g., a tracked device) heading. When the WPS location estimates were analyzed collectively (e.g. as tracks of time that form path shapes) the WPS location coverage resembled the tracked subject's path traversed, and long stretches of points can be correlated to the tracked subject's heading. The tracked subject's location estimations from Wi-Fi are not stable when the subject is stationary. When indoors the locations are less accurate, but often contained in/around the correct building for well-surveyed sites. The WPS location trends irrespective of quality were found to be repeatable, and have the potential to be used as a signature.

Figure 3:
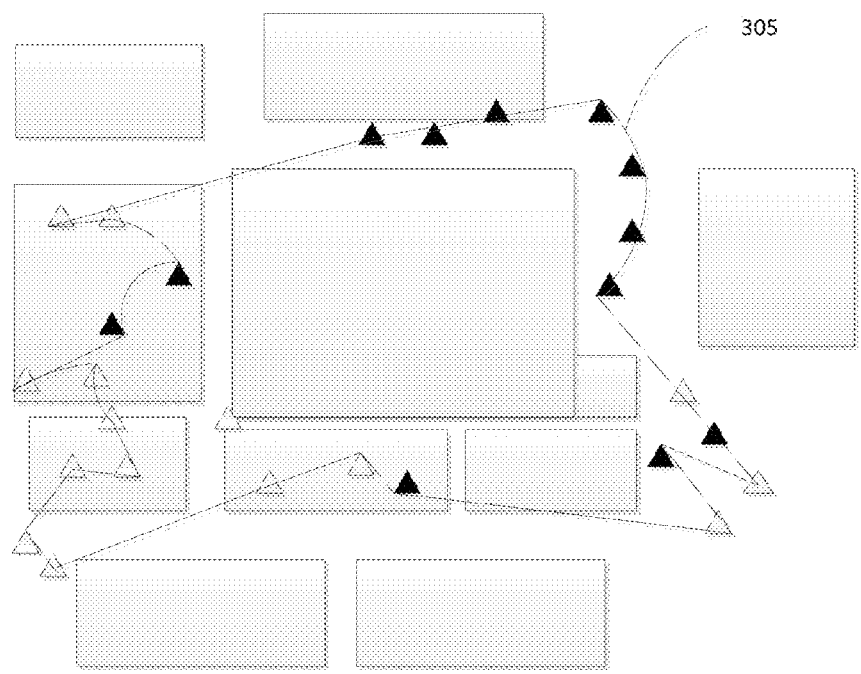
FIG. 3 illustrates Wi-Fi positioning system location estimate path.
Figure 4:
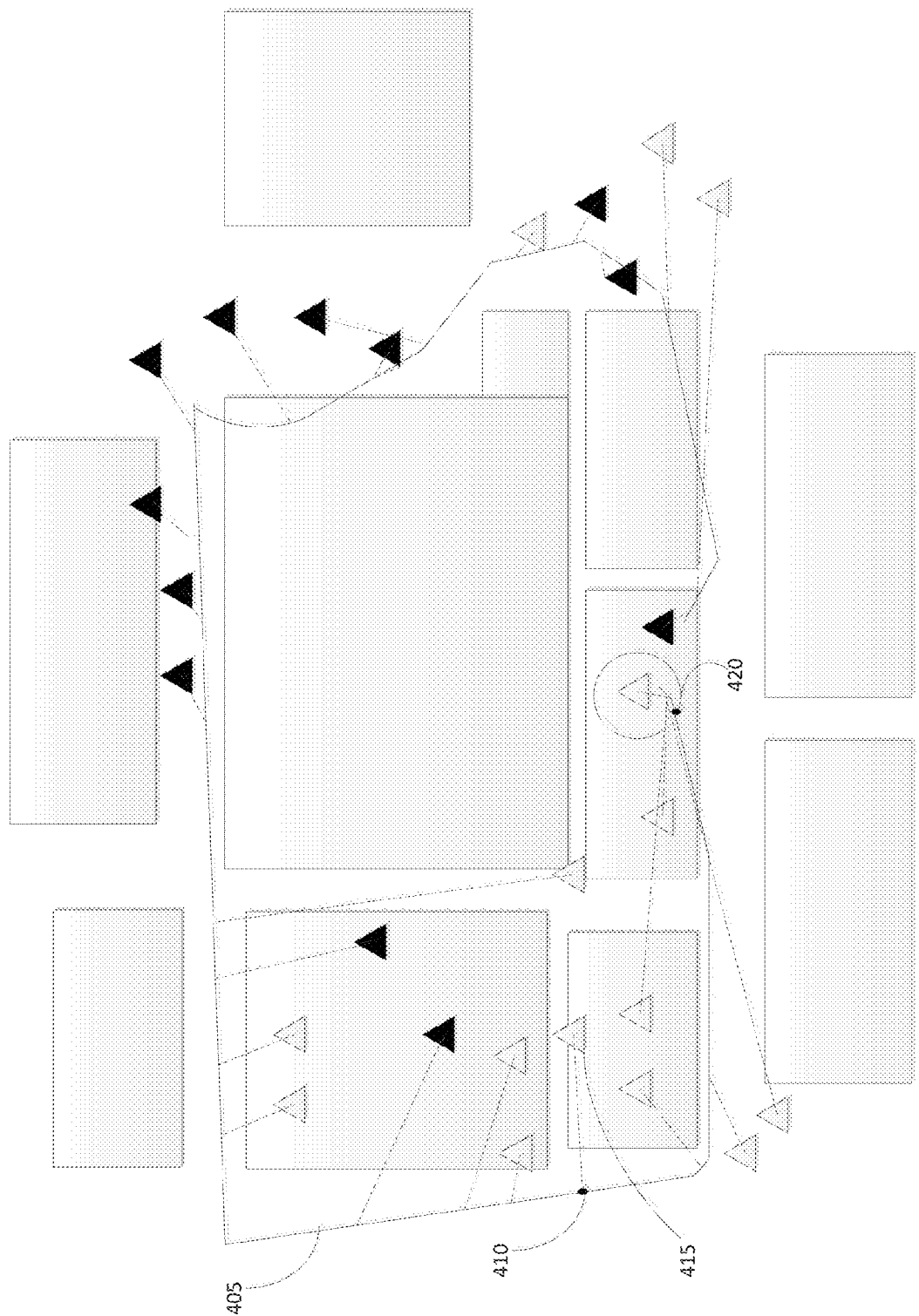
FIG. 4 illustrates a dead reckoning path estimate and a corresponding Wi-Fi positioning system location estimate of a path traversed with a tracking device.

FIG. 4 is an exemplary illustration of a dead reckoning (e.g., inertial) path estimate 405 recorded while traversing area 200. Periodically, during the traversal of the path, WPS location was recorded. The triangular shapes in FIG. 4 represent WPS location estimates (e.g., Wi-Fi point 415). As shown in FIG. 4, the lines from the WPS location estimates are connected to the related inertial location estimate 405. For example, at the position of the inertial location 410, the corresponding WPS location estimate was reported by the WPS location provider to be at 415. Line 305 was drawn in FIG. 3 to illustrate how the recorded WPS location trail 305 is relatively similar in shape to the traversed area as depicted in FIG. 4.

Figure 5:
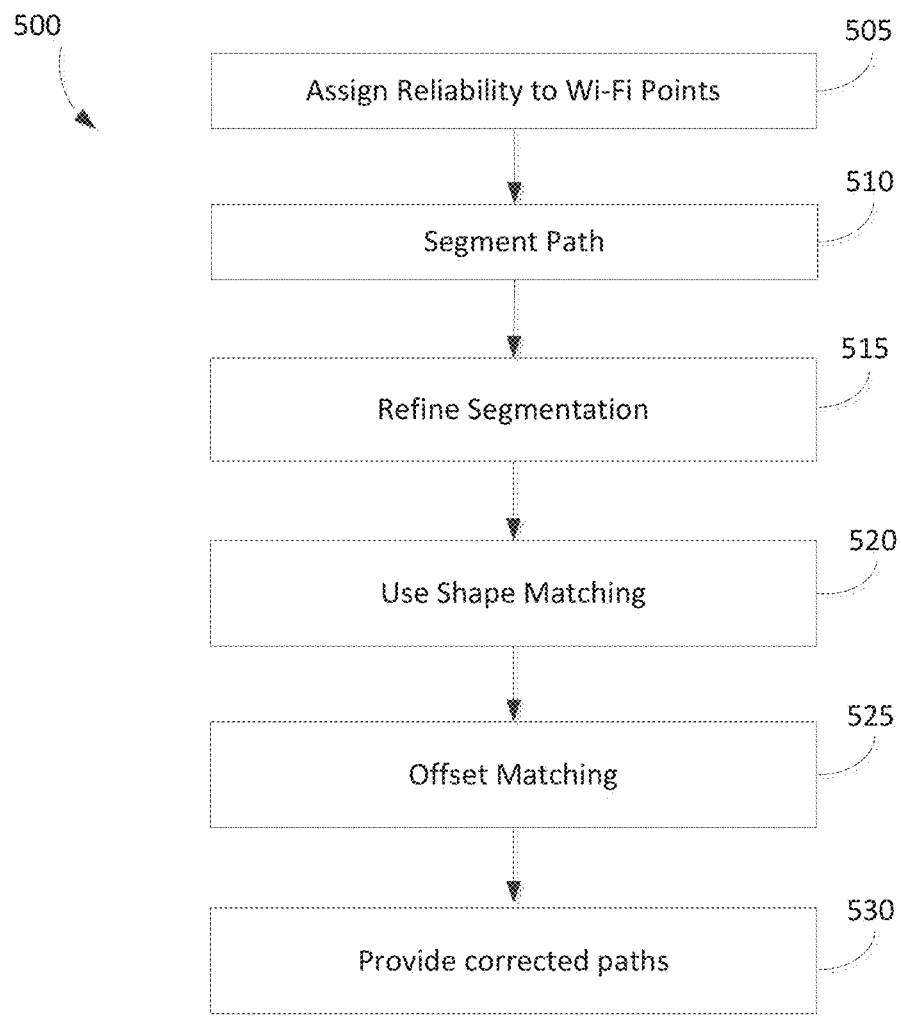
FIG. 5 illustrates a non-limiting exemplary method of implementing Wi-Fi enhanced tracking.

FIG. 5 illustrates a non-limiting exemplary method 500 of implementing Wi-Fi enhanced tracking which may be integrated into a navigation engine. At block 505, a reliability number is assigned to a WPS location estimate received by the mobile device. The WPS location estimates are each assigned a reliability, which may be any determined range (e.g., between 0 and 1). The use of a reliability number serves as a mechanism to flag the data that may be erroneous and eliminate it from contributing to the final solution. The location estimate of the Wi-Fi access point may be first assigned a sensor reliability using only the WPS location. The assigned sensor reliability includes using the error estimates of a first WPS location (which may be provided by a WPS provider) and the error estimates of a neighboring second WPS location estimate and agreement with rules imposed by the tracked subject's motion model limitations (for example, maximum velocity limitations when a person is walking with the mobile device versus driving with the mobile device).

Once the sensor reliability is set, the data is compared over the short term to other sensor data, which is referenced herein as the matching reliability. For example, inertial sensors provide high accuracy relative motion over an interval. The inertial path segments are compared to segments in the WPS locations over the same time interval. Similarly the WPS locations are compared with other global location estimates such as GPS with the reliability of a point increasing with increasing degree of agreement with other sensors.

The final WPS location reliability is assigned as a weighted combination of the sensor and matching reliabilities. An example is shown in FIG. 4, with the highest reliability Wi-Fi access points as shaded triangles, and the lower reliabilities as non-shaded triangles. The non-shaded WPS locations are considered low accuracy estimates since they are all attached to a single point 420 estimate as shown in FIG. 4 even though they seem to lie along the tracked subject's path.

In an embodiment, relatively large (e.g., a minute or so in the tested scenario) time intervals of the WPS location estimates are then compared to the same time interval of inertial points to determine global parameters such as the best offset and scaling for the inertial path to achieve a maximum overlap. These routines use the WPS locations in their cost functions weighted by their computed reliabilities. Offset matching in the beginning of the tracking session is used for tracking initialization in the case of no initialization or low accuracy initialization.

Figure 6:
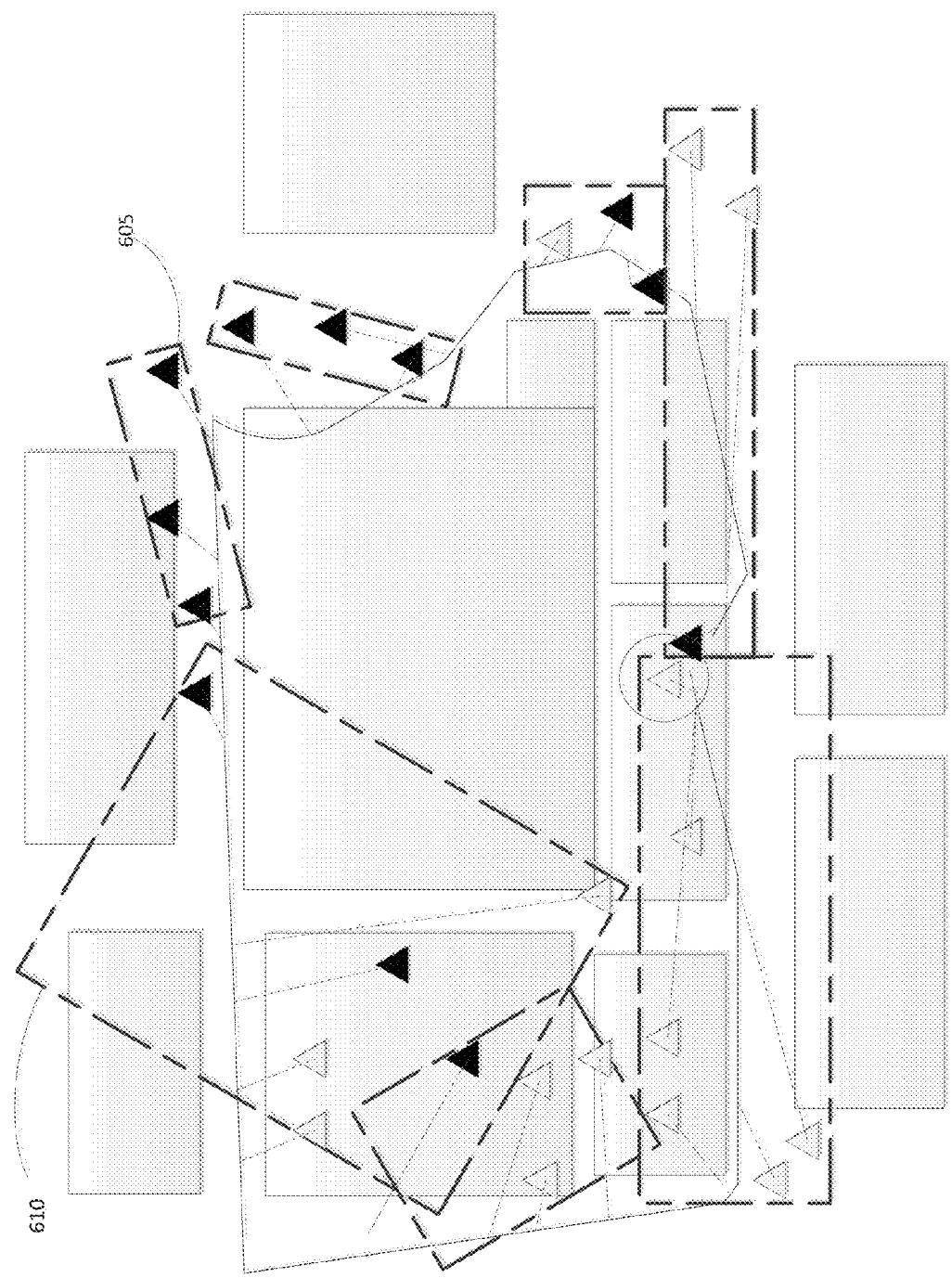
FIG. 6 is an exemplary illustration of segmentation of Wi-Fi locations using minimum bounding boxes corresponding to straight stretches of dead reckoning tracking points.

At block 510, path segmentation, which may include WPS location segmentation with dead reckoning (e.g., inertial), is performed to identify straight stretches. The WPS locations are then segmented based on straight sections of the inertial path. The rectangles, such as rectangle 605 or rectangle 610 in FIG. 6, contain WPS location estimates associated with inertial segments. This is a filtering mechanism where the inertial device indicates that the tracked subject is moving in a certain direction (e.g., straight line direction) implying that the Wi-Fi predictions "should" lie along a straight line too. The associated Wi-Fi rectangle (e.g., rectangle 610) may be obtained by computing the minimum bounding box of the WPS locations for the same time interval. The width of the rectangle is an indicator of how well the section matches the inertial trend. These rectangles (or lines) can be grouped to form Wi-Fi shapes for shape matching with the inertial shape data, where their orientation is the heading prediction for the current straight stretch of data. Generally, segmentation with a minimum oriented bounding box is done by collecting tracking points for the trackee (e.g., a mobile device) along a tracking path and dividing the tracking path into segments of tracking points, wherein each segment includes a group of tracking points contained within a minimum oriented bounding box having a selected threshold maximum width. In addition segmentation may be based on using standard deviation of the WPS location estimate points from the best fit line which is less than a threshold or more simply, stretches between changes in heading of some threshold. Other implementations of path segmentation that are known in the art may be used, such as segmenting the path when a turn greater than a certain threshold angle is made.

Figure 7:
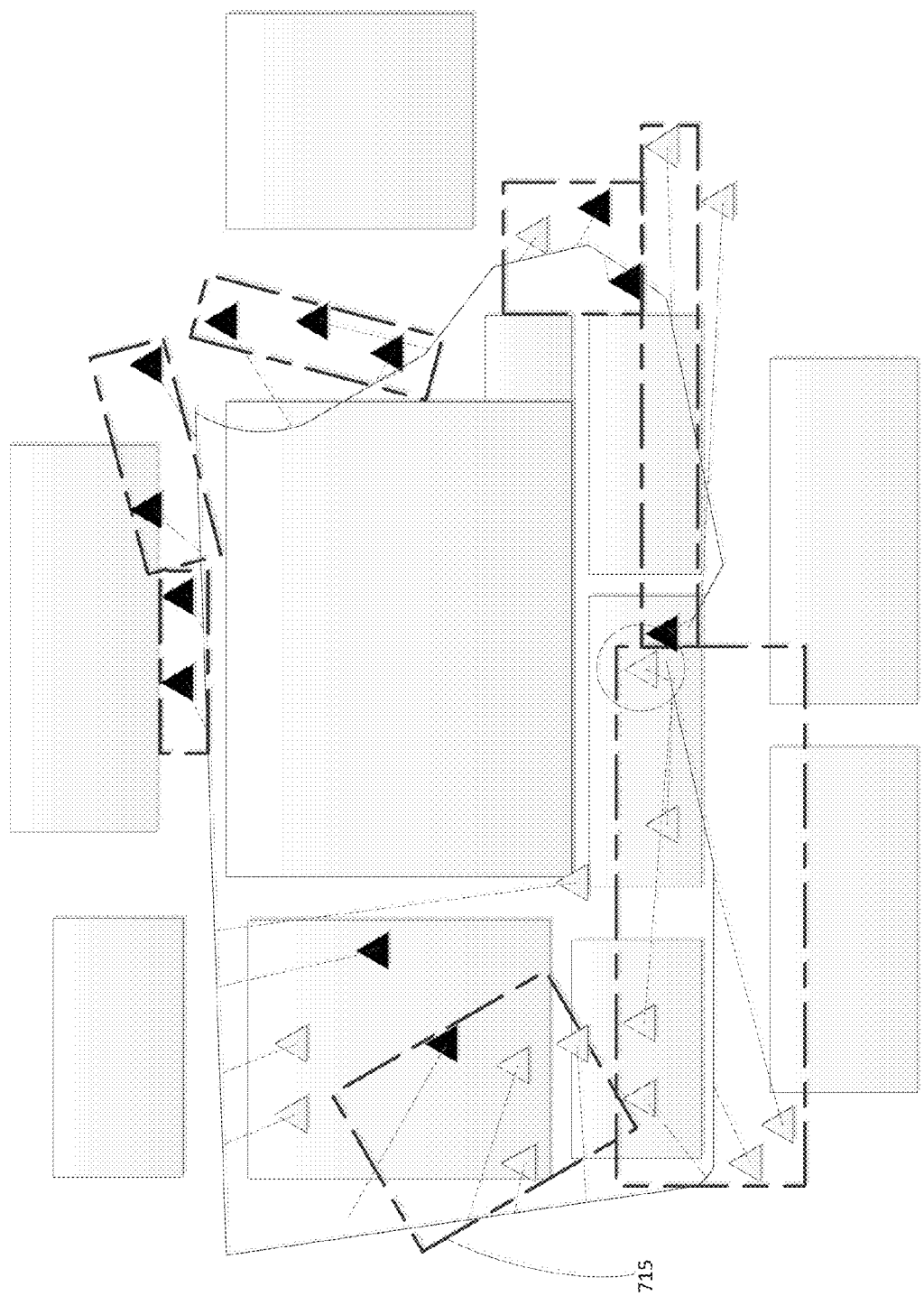
FIG. 7 is an exemplary illustration of segmentation enhancement.

At block 515, there is segmentation refinement which includes considering the WPS location reliability. The Wi-Fi segmentations may be further ordered by considering the point reliabilities of the WPS locations in each bounding box. Segmentations with higher reliability WPS locations inside a box with relatively low area and width are considered for high accuracy heading corrections and location corrections. And larger rectangles, such as rectangle 715 of FIG. 7, which contain lower accuracy point reliabilities, are considered for general traversed area comparison algorithms. Note some large rectangles that are larger than a predetermined threshold, such as rectangle 610, which may also include low reliability WPS locations, may be removed. And, when appropriate, the larger rectangle may be replaced with smaller rectangles confining just the high reliability shaded WPS location estimates resulting in rectangles more accurately indicative of the tracked subject's heading. FIG. 7 shows rectangle 610 removed and other boxes added or modified.

In some embodiments, methods may use the direct segmentation results to take advantage of the general tracked subject's path while matching. Higher accuracy methods may use more refined segmentation. In this step, each segment is scanned for its highest reliability WPS locations by clustering. The highest cluster is then approximated using a new bounding box. This bounding box is a better indication of the tracked subject heading. The heading prediction reliability of each segment/rectangle is set favoring low width, higher length, and the count and average reliability of the WPS locations used to derive it.

Figure 8:
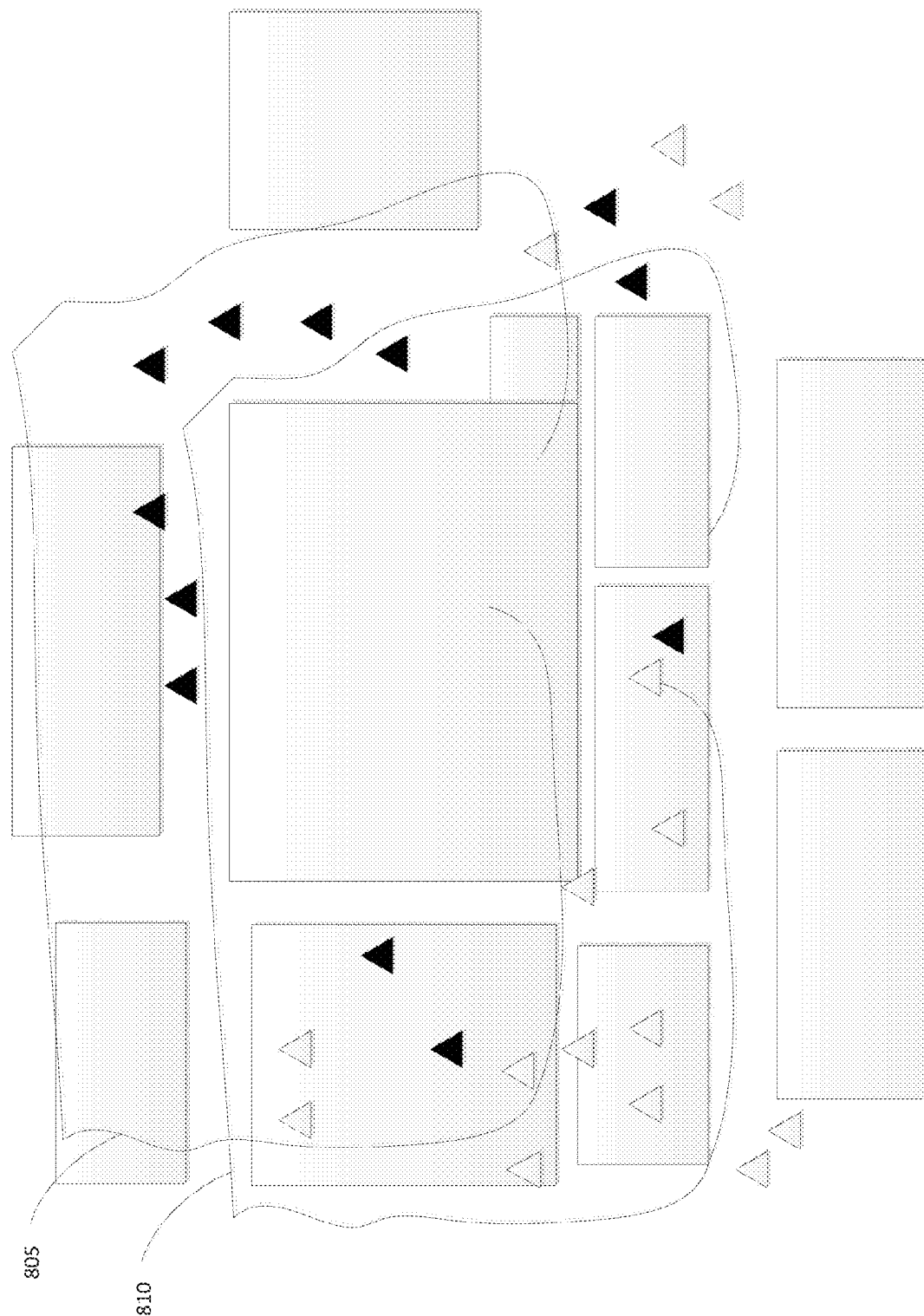
FIG. 8 is an exemplary illustration of initialization comparison using Wi-Fi and GPS.

At block 520, there may be shape matching where the overlap of the shapes are computed to determine the extent of the match. Groups of consecutive long segments then enter the shape matching routines, where the overlap is computed to determine the extent of the match. The match quality determines the probability of the shapes being the same and within a correction range. The tracking estimate navigates through the WPS location segments when a high quality match is found At block 525, WPS location offset matching may be used to correct erroneous start locations that may have been given to the navigation engine. For example, in FIG. 8 path 805 used GPS only for initialization and does not use Wi-Fi. The GPS initialized path 805 may use the inertial path to build path 805. The triangles are the WPS locations estimates associated with the inertial path and path 810 is the navigation engine's tracking estimate after using the Wi-Fi for initialization override. The Wi-Fi corrected path 810 is a closer match to the ground truth path in FIG. 2.

Figure 9:
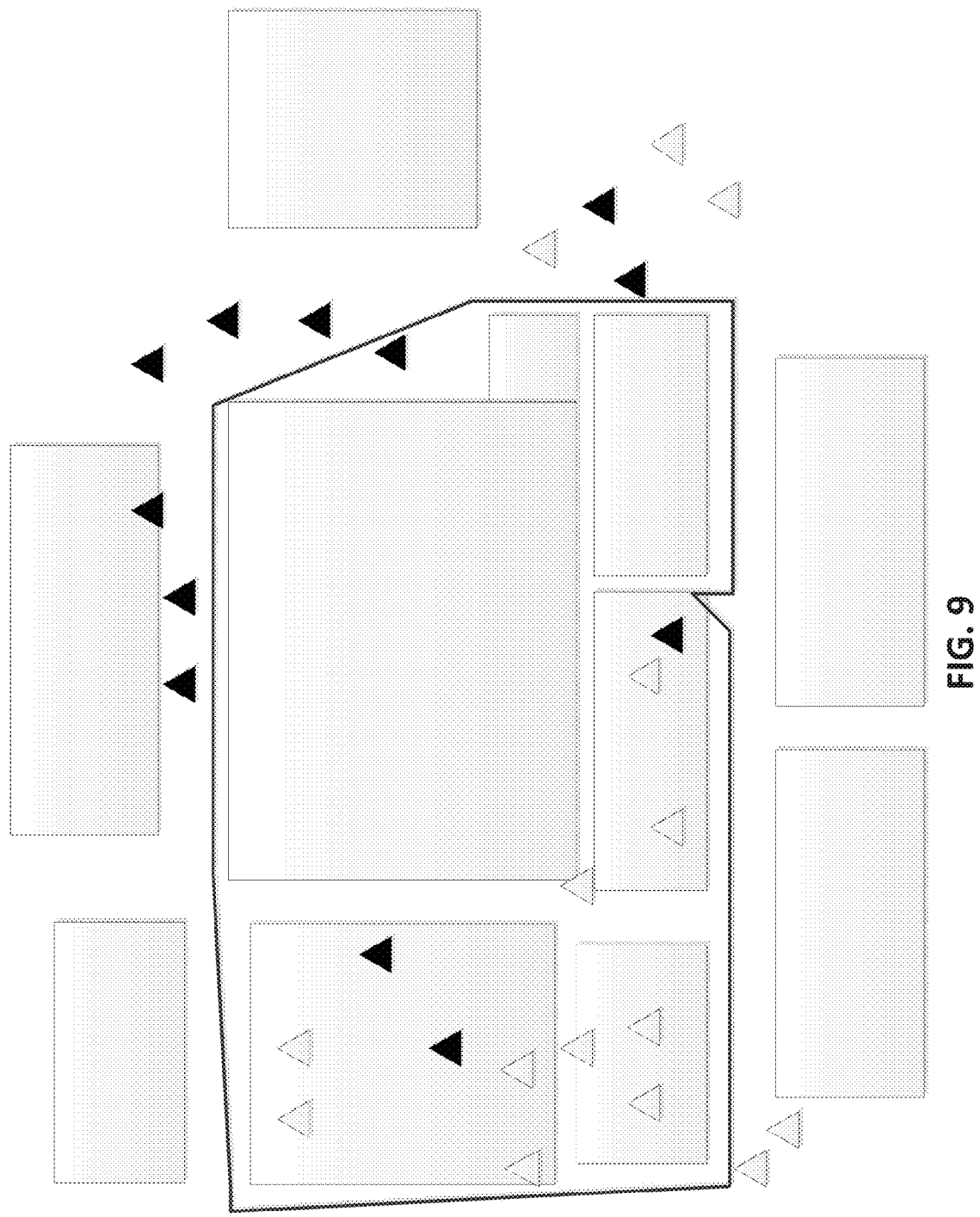
FIG. 9 is an illustration of a final enhancement including heading corrections to further improve path quality.

At block 530, a corrected path is provided. FIG. 9 shows the final enhancement including heading corrections which further improve the path quality. The heading corrections prove effective especially during long paths because walking straight for a few hundred meters at even 10 degree heading error may cause location errors of the order of 50 meters. The point level reliabilities and match qualities described above allow the engine's correction and solve mechanisms to determine the error bounds within which each correction must be satisfied allowing it to avoid outliers.

The accuracy of WPS location within areas, such as urban centers and malls, have been tested and methods have been devised to selectively use this data. The navigation computation is extended to include location information available via a handheld device including Wi-Fi, GPS, and fused cellular positioning information. The use of WPS location alone in this test was not indicative of the path traversed by a mobile device while indoors of a relatively small building, but during tests the WPS locations were usually found to be inside the building. The observation that WPS location estimates were usually found inside the building can aid in building selection, and general tracking location initialization, as well as correction, if the errors built up over time are large (e.g., one block). Also, as Wi-Fi access point locations increase, the accuracy of a path traversed by a mobile device may increase especially in larger buildings such as malls, airports, and similar points of interest. The general vicinity of Wi-Fi access point locations, especially in large buildings, may play a probabilistic weight in predicting a location of a mobile device indoors. For example, a navigation engine may compute and display the better choice in a case where there is a choice between parallel hallways, or two candidate stairwells.

In summary, Wi-Fi tests of areas, such as area 80, has led to the following regarding how Wi-Fi may enhance location calculations. With regard to tracking session initialization, in several applications it may not be possible to manually enter the start location of the personnel or the personnel may not know their own location. In other cases GPS may be unavailable or too slow to lock on. In these cases, automatic initialization via Wi-Fi may be used to give a general starting location for the tracked subject. For building detection, there is a high probability of the WPS locations being in and around the correct building which may enhance a building selection mechanism of the navigation engine. To help effectively use the WPS locations, Inlier detection algorithms may isolate 5-10% higher (or other determined amount) accuracy WPS locations for precise correction algorithms.

With regard to WPS location reliability computation and matching, when correcting positions and headings using location estimates with high probability of larger errors (as observed in the WPS location estimates), all predictions should not necessarily be considered equally. A reliability measure may be assigned to each WPS location estimate by considering factors such as the predicted error bounds (for example, bounds predicted based on inertial track drift and scale errors), the agreement of the short term Wi-Fi path to the inertial trends, and the agreement with GPS (when available) to find the inliers which may be used for high level correction algorithms.

Analysis of the patterns of the WPS location estimates revealed the WPS locations estimates to be more useful as shapes. Concepts are conducive to analyzing the WPS locations over time-windows and shapes, to correct the general location of large group of tracking points. High-level matching may be performed by segmenting the Wi-Fi data using inertial tracking points as a reference, which can be grouped to form shapes.

The highest match quality segments may be used to perform heading corrections to correct for drifting errors. As described herein, these may be useful in indoor environments or when personnel with tracking devices are walking close to buildings which may degrade the compass for long periods of time. The aforementioned concepts for enhancing tracking using Wi-Fi may be implemented within a navigation engine to enhance the tracking estimation accuracy. The navigation engine may be part of the mobile device (tracking device) or a remote computing device.

Without in any way limiting the scope, interpretation, or application of the claims appearing herein, a technical effect of one or more of the example embodiments disclosed herein is to provide adjustments to device tracking with the use of Wi-Fi information.

Figure 10:
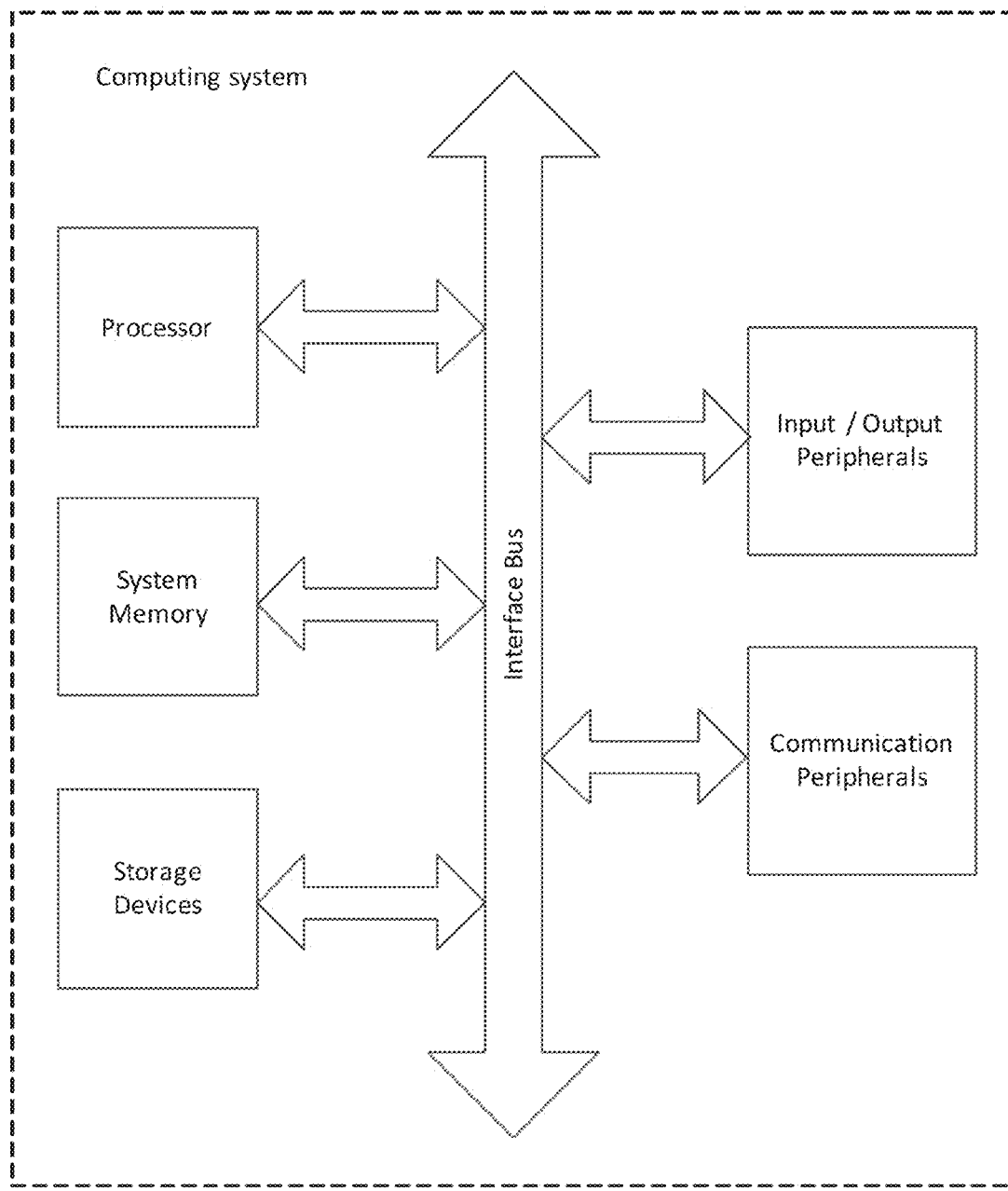
FIG. 10 is an exemplary block diagram representing a general purpose computer system in which aspects of the methods and systems disclosed herein or portions thereof may be incorporated.

The techniques described above can be implemented on a computing device associated with a user (e.g., dead reckoning, magnetic, gyroscope and accelerometer sensors implemented on a device worn by the user), a plurality of computing devices associated with a plurality of users, a server in communication with the computing device(s) (e.g., a server configured to calibrate the gyroscope and accelerometer sensors of the device worn by the user), or a plurality of servers in communication with the computing device(s). Additionally, the techniques may be distributed between the computing device(s) and the server(s). For example, the computing device may collect and transmit raw data to the server that, in turn, process the raw data to improve heading estimation. FIG. 10 illustrates an exemplary block diagram of a computing system that includes hardware modules, software module, and a combination thereof and that can be implemented as the computing device and/or as the server.

In a basic configuration, the computing system may include at least a processor, a system memory, a storage device, input/output peripherals, communication peripherals, and an interface bus. The interface bus is configured to communicate, transmit, and transfer data, controls, and commands between the various components of the electronic device. The system memory and the storage device comprise computer readable storage media, such as RAM, ROM, EEPROM, hard-drives, CD-ROMs, optical storage devices, magnetic storage devices, flash memory, and other tangible storage media. Any of such computer readable storage medium can be configured to store instructions or program codes embodying aspects of the disclosure. Additionally, the system memory comprises an operation system and applications. The processor is configured to execute the stored instructions and can comprise, for example, a logical processing unit, a microprocessor, a digital signal processor, and the like.

The system memory and the storage device may also comprise computer readable signal media. A computer readable signal medium may include a propagated data signal with computer readable program code embodied therein. Such a propagated signal may take any of variety of forms including, but not limited to, electro-magnetic, optical, or any combination thereof. A computer readable signal medium may be any computer readable medium that is not a computer readable storage medium and that can communicate, propagate, or transport a program for use in connection with the computing system.

Further, the input and output peripherals include user interfaces such as a keyboard, screen, microphone, speaker, other input/output devices, and computing components such as digital-to-analog and analog-to-digital converters, graphical processing units, serial ports, parallel ports, and universal serial bus. The input/output peripherals may be connected to the processor through any of the ports coupled to the interface bus.

The user interfaces can be configured to allow a user of the computing system to interact with the computing system. For example, the computing system may include instructions that, when executed, cause the computing system to generate a user interface that the user can use to provide input to the computing system and to receive an output from the computing system.

This user interface may be in the form of a graphical user interface that is rendered at the screen and that is coupled with audio transmitted on the speaker and microphone and input received at the keyboard. In an embodiment, the user interface can be locally generated at the computing system. In another embodiment, the user interface may be hosted on a remote computing system and rendered at the computing system. For example, the server may generate the user interface and may transmit information related thereto to the computing device that, in turn, renders the user interface to the user. The computing device may, for example, execute a browser or an application that exposes an application program interface (API) at the server to access the user interface hosted on the server.

Finally, the communication peripherals of the computing system are configured to facilitate communication between the computing system and other computing systems (e.g., between the computing device and the server) over a communications network. The communication peripherals include, for example, a network interface controller, modem, various modulators/demodulators and encoders/decoders, wireless and wired interface cards, antenna, and the like.

The communication network includes a network of any type that is suitable for providing communications between the computing device and the server and may comprise a combination of discrete networks which may use different technologies. For example, the communications network includes a cellular network, a WiFi/broadband network, a local area network (LAN), a wide area network (WAN), a telephony network, a fiber-optic network, or combinations thereof. In an example embodiment, the communication network includes the Internet and any networks adapted to communicate with the Internet. The communications network may be also configured as a means for transmitting data between the computing device and the server.

The techniques described above may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only, and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed:

1. A computer-implemented method of tracking a trackee, the method being implemented by a computer that includes a physical processor, the method comprising:
    obtaining dead reckoning tracking data for a tracked subject, wherein the dead reckoning tracking data includes a plurality of tracking points forming a tracking path of the tracked subject;
    obtaining a at least one weighted Wi-Fi position system location estimate based on a plurality of Wi-Fi position system location estimates that are correlated to the dead reckoning tracking data;
    determining a tracking path adjustment parameter based on how the dead reckoning tracking data correlates to the weighted Wi-Fi position system location estimate, the tracking path adjustment parameter configured to correct the tracking path of the tracked subject.

2. The method of claim 1, wherein the tracking path adjustment parameter comprises at least one of: a global offset, a rotation, a drift, or a scale.

3. The method of claim 1, further comprising
    assigning a reliability number to a Wi-Fi position system location estimate; and using the reliability number to weight a contribution of the Wi-Fi position system location estimate to create the weighted Wi-Fi position system location estimate.

4. The method of claim 3, wherein the reliability number is based on at least one of
an error property of the Wi-Fi position system location estimate, or
a consistency with a motion model of the tracked subject.

5. The method of claim 3, further comprising:
performing path segmentation on the tracking path;
determining a shape that bounds the plurality of Wi-Fi position system location estimates;
refining segmentation of the tracking path based on the reliability numbers assigned to the plurality of Wi-Fi position system location estimates; and
performing shape matching on the refined path segmentation.

6. The method of claim 1, further comprising:
providing a corrected path based on the tracking path adjustment parameter.

7. The method of claim 1, wherein the dead reckoning tracking data is obtained from at least one of an inertial sensor, an optical flow sensor, a Doppler velocimeter, or a wheel encoder.

8. A computing system comprising:
a dead reckoning sensor;
a processor communicatively connected with the dead reckoning sensor, the processor adapted to execute computer-readable instructions; and
a memory communicatively coupled to said processor, said memory having stored therein computer-readable instructions that, if executed by the processor, cause the processor to perform operations comprising:
obtaining dead reckoning tracking data for a tracked subject obtained from the dead reckoning sensor, wherein the dead reckoning tracking data includes a plurality of tracking points forming a tracking path of the tracked subject;
obtaining a weighted Wi-Fi position system location estimate based on a plurality of Wi-Fi position system location estimates that are correlated to the dead reckoning tracking data;
determining a tracking path adjustment parameter based on how the dead reckoning tracking data correlates to the weighted Wi-Fi position system location estimate, the tracking path adjustment parameter configured to correct the tracking path of the tracked subject.

9. The computing system of claim 8, wherein the tracking path adjustment parameter comprises at least one of: a global offset, a rotation, a drift, or a scale.

10. The computing system of claim 8, further comprising instructions, if executed by the processor, cause the processor to perform operations comprising:
assigning a reliability number to a Wi-Fi position system location estimate; and
using the reliability number to weight a contribution of the Wi-Fi position system location estimate to create the weighted Wi-Fi position system location estimate.

11. The computing system of claim 10, wherein the reliability number is based on at least one of
an error property of the Wi-Fi position system location estimate, or
a consistency with a motion model of the tracked subject.

12. The computing system of claim 10, further comprising instructions, if executed by the processor, causes the processor to perform operations comprising:
performing path segmentation on the tracking path;
determining a shape that bounds the plurality of Wi-Fi position system location estimates;
refining segmentation of the tracking path based on the reliability numbers assigned to the plurality of Wi-Fi position system location estimates; and
performing shape matching on the refined path segmentation.

13. The computing system of claim 8, further comprising instructions, if executed by the processor, cause the processor to perform operations comprising:
providing a corrected tracking path of the tracked subject based on the tracking path adjustment parameter.

14. The computing system claim 8, wherein the dead reckoning sensor is at least one of an inertial sensor, an optical flow sensor, a Doppler velocimeter, or a wheel encoder.

15. A non-transitory computer readable storage device having stored therein computer-readable instructions that, if executed by a processor, cause the processor to perform operations comprising:
obtain dead reckoning tracking data for a tracked subject, wherein the dead reckoning tracking data includes a plurality of tracking points forming a tracking path of the tracked subject;
obtain a weighted Wi-Fi position system location estimate based on a plurality of Wi-Fi position system location estimates that are correlated to the dead reckoning tracking data;
determine a tracking path adjustment parameter based on how the dead reckoning tracking data correlates to the weighted Wi-Fi position system location estimate, the tracking path adjustment parameter configured to correct the tracking path of the tracked subject.

16. The non-transitory computer readable storage device of claim 15, wherein the tracking path adjustment parameter comprises at least one of: a global offset, a rotation, a drift, or a scale.

17. The non-transitory computer readable storage device of claim 15, further comprising instructions, if executed by the processor, causes the processor to perform operations comprising:
assign a reliability number to a Wi-Fi position system location estimate; and
use the reliability number to weight a contribution of the Wi-Fi position system location estimate to create the weighted Wi-Fi position system location estimate.

18. The non-transitory computer readable storage device of claim 17, wherein the reliability number is based on at least one of
an error property of the Wi-Fi position system location estimate,
a second error property of a neighboring Wi-Fi position system location estimate, or
a consistency with a motion model of the tracked subject.

19. The non-transitory computer readable storage device of claim 17, further comprising instructions, if executed by the processor, causes the processor to perform operations comprising:
perform path segmentation on the tracking path;
determine a shape that bounds the plurality of Wi-Fi position system location estimates;
refine segmentation of the tracking path based on the reliability numbers assigned to the plurality of Wi-Fi position system location estimates; and
perform shape matching on the refined path segmentation.

20. The non-transitory computer readable storage device of claim 15, further comprising instructions, if executed by the processor, causes the processor to perform operations comprising:
provide a corrected path based on the tracking path adjustment parameter.

\* \* \* \* \*